US010802111B2

(12) United States Patent

Turcotte et al.

(10) Patent No.: US 10,802,111 B2

(45) Date of Patent: Oct. 13, 2020

(54) THROUGH AIR RADAR LEVEL TRANSMITTER WITH MEASUREMENT OF FIRST MOVING ECHO

(71) Applicant: Magnetrol International, Incorporated, Aurora, IL (US)

(72) Inventors: Christopher P. Turcotte, Brookfield, WI (US); Steven R. Page, Naperville, IL (US)

(73) Assignee: Magnetrol International, Inc., Aurora, IL (US)

( * ) Notice: Subject to any disclaimer, the term of this patent is extended or adjusted under 35 U.S.C. 154(b) by 294 days.

(21) Appl. No.: 15/888,280

(22) Filed: Feb. 5, 2018

(65) Prior Publication Data

US 2018/0238997 A1 Aug. 23, 2018

Related U.S. Application Data

(60) Provisional application No. 62/455,130, filed on Feb. 6, 2017.

(51) Int. Cl.

*G01S 7/292* (2006.01)
*G01F 23/00* (2006.01)

(Continued)

(52) U.S. Cl.

CPC ........ *G01S 7/2923* (2013.01); *G01F 23/0069* (2013.01); *G01F 23/284* (2013.01);

(Continued)

(58) Field of Classification Search

CPC ........ G01S 13/88; G01S 13/28; G01S 13/282; G01S 13/524; G01S 1/02;

(Continued)

(56) References Cited

U.S. PATENT DOCUMENTS 3,972,042 A * 7/1976 Johnson ................ G01S 13/753 342/62
5,321,408 A * 6/1994 Jean ...................... G01F 23/284 342/124

(Continued)

FOREIGN PATENT DOCUMENTS

WO WO-2015197229 A1 * 12/2015 ............ G01S 7/354

OTHER PUBLICATIONS

International Search Report and the Written Opinion for corresponding PCT Application No. PCT/US18/16850 dated Apr. 24, 2018.

*Primary Examiner* — Olumide Ajibade Akonai

(74) *Attorney, Agent, or Firm* — Wood, Phillips, Katz, Clark & Mortimer

(57) ABSTRACT

A level measurement instrument comprises an analog circuit for transmitting a pulse signal at a target of interest and receiving reflected echoes of the pulse signal and developing an echo waveform representative of the reflected echoes. A programmed digital circuit is operatively coupled to the analog circuit and comprises a programmed controller and memory. The controller is operatively programmed to identify peaks in the echo waveform and store an active peak list in the memory from a current measurement scan and a buffer peak list from prior measurement scans. The controller is further programmed to match peaks in the active peak list to peaks in the buffer peak list, to select a target peak from the active peak list based on which of the matched peaks have moved, and determining material level responsive to the target peak.

20 Claims, 8 Drawing Sheets

(51) Int. Cl.

| | |
|---|---|
| ***G01S 13/10*** | (2006.01) |
| ***G01F 23/284*** | (2006.01) |
| ***G01S 13/522*** | (2006.01) |
| ***G01S 13/88*** | (2006.01) |
| ***G01S 7/02*** | (2006.01) |
| ***G01F 25/00*** | (2006.01) |
| ***H01Q 1/22*** | (2006.01) |

(52) U.S. Cl.

CPC .......... *G01S 13/103* (2013.01); *G01S 13/522* (2013.01); *G01S 13/88* (2013.01); *G01F 25/0061* (2013.01); *G01S 2007/027* (2013.01); *H01Q 1/225* (2013.01)

(58) Field of Classification Search

CPC .... G01S 2007/356; G01S 7/352; G01S 7/354; G01S 7/536; G01S 7/2923; G01S 13/522; G01S 13/103; G01S 2007/027; G01F 23/284; G01F 23/296; G01F 25/0061; G01F 23/2962; G01F 23/28; G01F 23/0076; G01F 23/0069; G01C 13/002; H01Q 1/225

USPC ........................................ 342/124; 73/290 V

See application file for complete search history.

(56) References Cited

U.S. PATENT DOCUMENTS

| | | | | |
|---|---|---|---|---|
| 5,969,666 A * | 10/1999 | Burger | G01S 7/411 | 342/124 |
| 6,062,070 A | 5/2000 | Maltby et al. | | |
| 6,166,682 A * | 12/2000 | Kosugi | G01S 7/411 | 342/118 |
| 9,024,808 B2 * | 5/2015 | Kleman | G01F 23/284 | 342/118 |
| 9,207,306 B2 * | 12/2015 | Turcotte | G01S 7/2922 | |
| 2004/0130969 A1 | 7/2004 | Baldwin et al. | | |
| 2005/0072227 A1 | 4/2005 | Carter | | |
| 2006/0137446 A1 * | 6/2006 | Wennerberg | G01F 23/284 | 73/290 V |
| 2010/0182190 A1 * | 7/2010 | Spanke | G01F 23/284 | 342/124 |
| 2010/0290314 A1 | 11/2010 | Turcotte et al. | | |
| 2014/0360264 A1 * | 12/2014 | Vogel | G01F 23/284 | 73/290 V |
| 2016/0097669 A1 * | 4/2016 | Backstrom | G01S 7/527 | 342/124 |

* cited by examiner 50
76
78
16
74
18
14
70
72

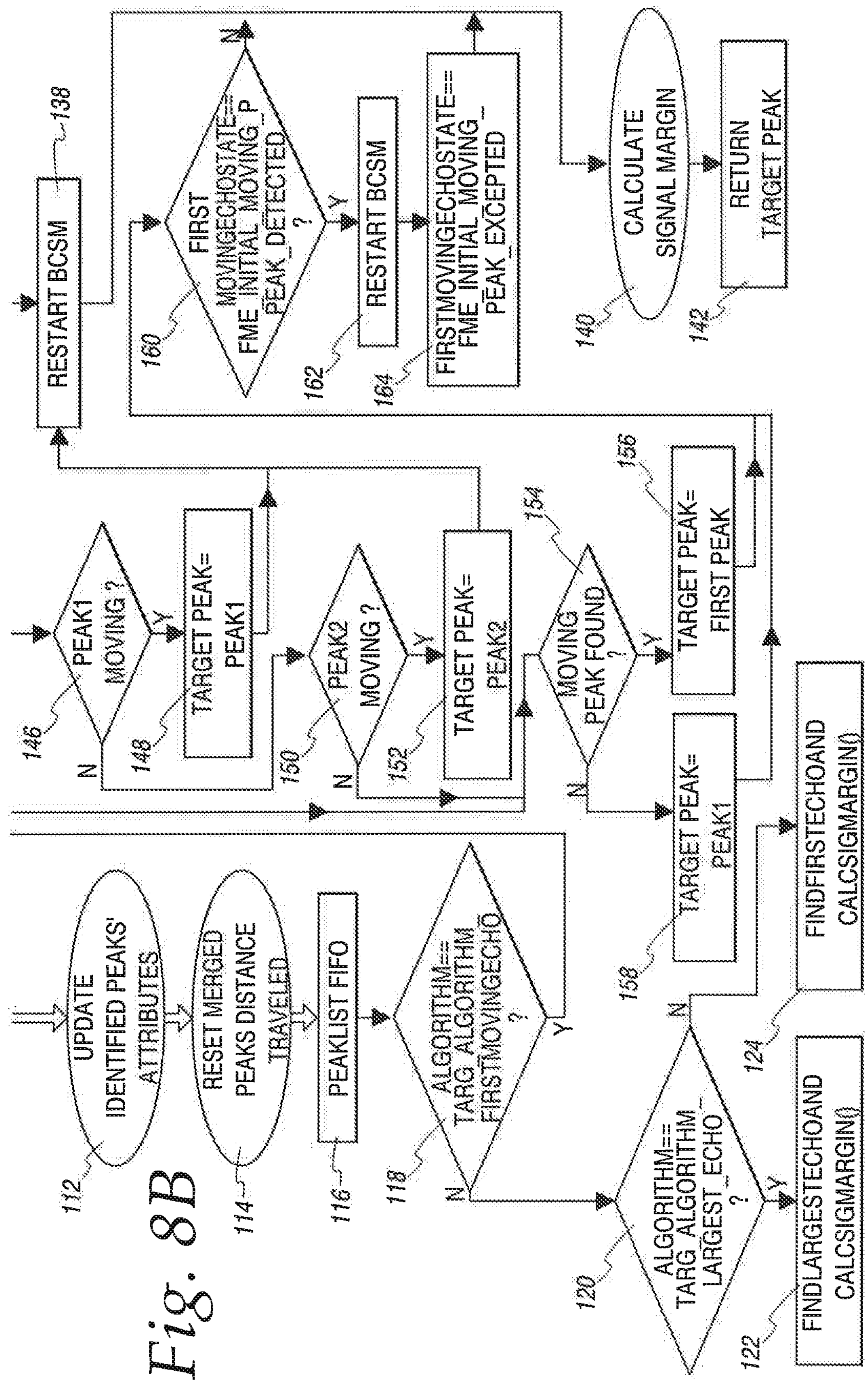

Fig. 8B
UPDATE IDENTIFIED PEAKS' ATTRIBUTES
112
RESET MERGED PEAKS DISTANCE TRAVELED
114
PEAKLIST FIFO
116
ALGORITHM== TARG_ALGORITHM_ FIRSTMOVINGECHO ?
118
Y
N
ALGORITHM== TARG_ALGORITHM_ LARGEST_ECHO ?
120
Y
N
FINDLARGESTECHOAND CALCSIGMARGIN()
122
FINDFIRSTECHOAND CALCSIGMARGIN()
124
PEAK1 MOVING ?
146
Y
N
TARGET PEAK= PEAK1
148
PEAK2 MOVING ?
150
Y
N
TARGET PEAK= PEAK2
152
MOVING PEAK FOUND ?
154
Y
N
TARGET PEAK= FIRST PEAK
156
TARGET PEAK= PEAK1
158
RESTART BCSM
138
FIRST MOVINGECHOSTATE== FME_INITIAL_MOVING_P PEAK_DETECTED ?
160
Y
N
RESTART BCSM
162
FIRSTMOVINGECHOSTATE== FME_INITIAL_MOVING_ PEAK_EXCEPTED
164
CALCULATE SIGNAL MARGIN
140
RETURN TARGET PEAK
142

THROUGH AIR RADAR LEVEL TRANSMITTER WITH MEASUREMENT OF FIRST MOVING ECHO

CROSS-REFERENCE TO RELATED APPLICATIONS

This application claims priority of provisional application No. 62/455,130, filed Feb. 6, 2017.

FEDERALLY SPONSORED RESEARCH OR DEVELOPMENT

Not Applicable.

MICROFICHE/COPYRIGHT REFERENCE

Not Applicable.

FIELD

This invention relates to process control instruments and, more particularly, to through air radar level transmitter with measurement of first moving echo.

BACKGROUND

Process control systems require the accurate measurement of process variables. Typically, a sensor in the form of a primary element senses the value of a process variable and a transmitter develops an output having a value that varies as a function of the process variable. For example, a level transmitter includes a primary element for sensing level and a circuit for developing an electrical signal representing sensed level.

Knowledge of level in industrial process tanks or vessels has long been required for safe and cost-effective operation of plants. Many technologies exist for making level measurements. These include buoyancy, capacitance, ultrasonic and microwave radar, to name a few.

In one form, a through air measurement instrument, such as a microwave radar level transmitter, launches a radar signal which reflects off a liquid or other surface and the instrument measures time of flight between transmission and reception of the radar signal. Electrical energy is converted to an electromagnetic wave from a launch element. The wave propagates through free space.

Particularly, a pulse generator generates a pulse signal directed at a target of interest. Reflected echoes of the pulse signal are received and the instrument develops an echo waveform representative of the reflected echoes. A target echo represents the process liquid or other media surface of interest. There may be additional, spurious echoes owing to the pulse signal reflecting off the tank wall and various appurtenances within the tank. The measurement instrument must select the target echo from all the echoes within the echo waveform.

Existing through air level measurement instruments use various methods for determining the echo corresponding to the process media surface from available echoes. Among these are the first echo and the largest echo. Use of first echo criteria selects the peak that is closest to the transmitter, among those peaks whose amplitude exceeds a configurable threshold. A largest echo process selects the peak with the greatest amplitude. This also requires the peak to exceed a threshold. However, both methods may result in selection of a peak that does not correspond to the actual media surface, particularly in the presence of obstructions such as mixing blades.

The present invention is directed to solving one or more of the problems discussed above in a novel and simple manner.

SUMMARY

As described herein, a through air radar level transmitter uses motion detection to find the target echo.

Broadly, there is disclosed herein a level measurement instrument comprising an analog circuit for transmitting a pulse signal at a target of interest and receiving reflected echoes of the pulse signal and developing an echo waveform representative of the reflected echoes. A programmed digital circuit is operatively coupled to the analog circuit and comprises a programmed controller and memory. The controller is operatively programmed to identify peaks in the echo waveform and store an active peak list in the memory from a current measurement scan and a buffer peak list from prior measurement scans. The controller is further programmed to match peaks in the active peak list to peaks in the buffer peak list, to select a target peak from the active peak list based on which of the matched peaks have moved, and determining material level responsive to the target peak.

It is a feature that the controller is operable to select a first moving echo as the target peak.

It is another feature that the controller is operable to store a prevailing target region and the target peak is selected based on one of a moving peak found closer than the prevailing target region, a moving peak found within the prevailing target region, or a moving peak found farther than the prevailing target region.

It is a further feature that the controller designates an active peak as a moving peak when it has a distance traveled value greater than a select threshold.

It is still another feature that peaks are matched by comparing attributes of peaks in the active peak list to peaks in the buffer peak list. The attributes may be selected from among peak position, peak height, peak width, peak type and change in peak position. Each of the attributes may have an associated merit factor for prioritizing the attributes comparison.

It is an additional feature that a peak remains designated as the target peak as long as the target peak remains detected and there are no other moving peaks closer to the instrument.

It is yet another feature that the controller determines a prevailing target region as a region centered on distance to a previously determined target peak. The controller may update the prevailing target region subsequent to each measurement scan.

There is disclosed in accordance with another aspect a through air measurement instrument comprising an RF circuit for transmitting a pulse signal at a target of interest and receiving reflected echoes of the pulse signal. An analog circuit is coupled to the RF circuit developing an echo waveform representative of the reflected echoes. A programmed digital circuit is operatively coupled to the analog circuit and comprises a programmed controller and memory. The controller implements a first moving echo algorithm to identify peaks in the echo waveform and store an active peak list from a current measurement scan and a buffer peak list from prior measurement scans. The first moving echo algorithm matches peaks in the active peak list to peaks in the peak buffer list, to select a target peak from the active peak list based on a first one of the matched peaks which have moved, and determining material level responsive to the target peak.

Other features and advantages will be apparent from a review of the entire specification, including the drawings and claims.

BRIEF DESCRIPTION OF THE DRAWINGS

FIGS. 8A and 8B are a flow chart illustrating first moving echo control logic.

DETAILED DESCRIPTION

Figure 1:
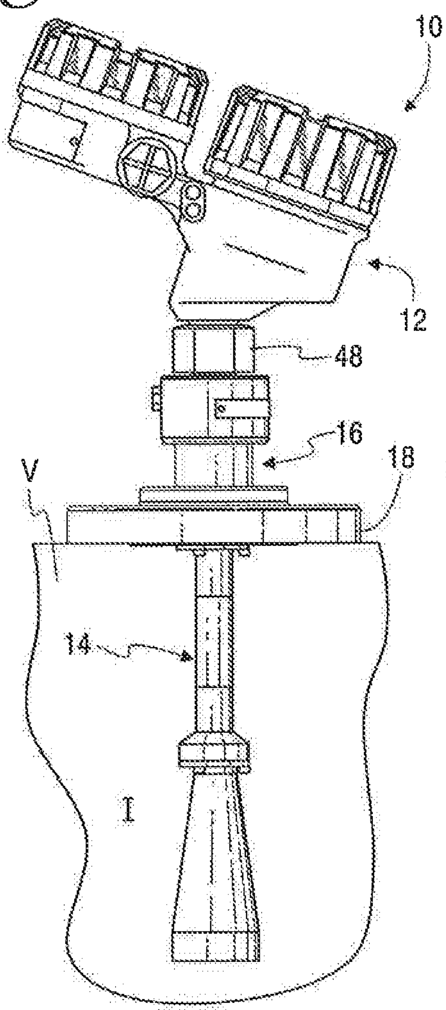
FIG. 1 is a side view of a process control instrument including a first moving echo algorithm in accordance with the invention.
Figure 2:
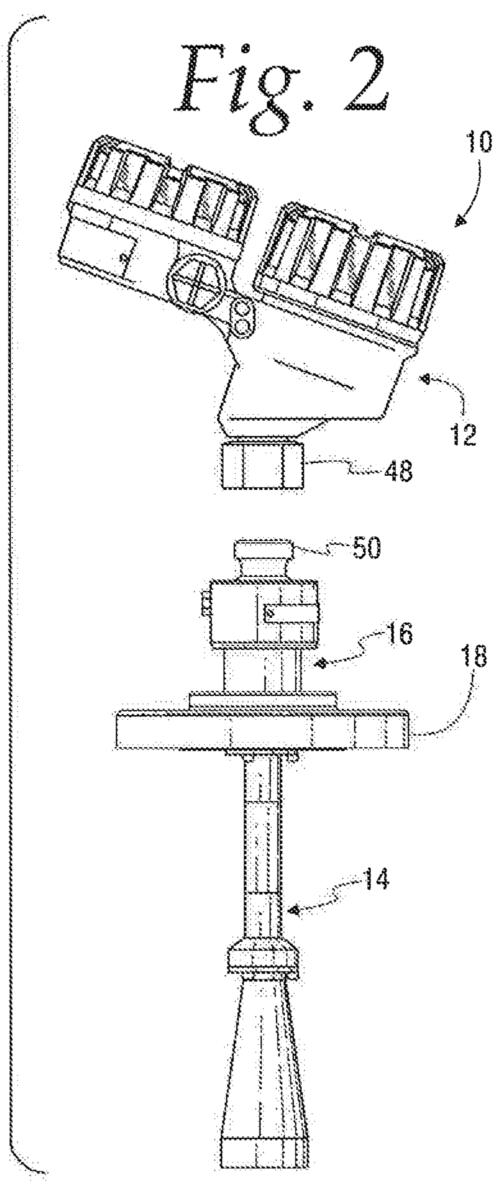
FIG. 2 is a side view, similar to FIG. 1, with a dual compartment control housing separate from a primary element.

Referring to FIGS. 1 and 2, a loop powered process control instrument 10, also referred to as a two-wire transmitter, according to the invention is illustrated. The process control instrument 10 uses micro power impulse radar (MIR) in conjunction with equivalent time sampling (ETS) and ultra-wideband (UWB) transceivers for measuring a level. Particularly, the instrument 10 uses through air radar for sensing level. While the embodiments described herein relate to an MIR level sensing apparatus, various aspects of the invention may be used with other types of process control instruments for measuring various process parameters, as will be apparent to those skilled in the art.

The process control instrument 10 includes a control housing 12 and a sensor or primary element 14. In the illustrated embodiment, the primary element 14 is an antenna.

The antenna 14 includes a process adapter 16 for connection to the housing 12. The process adapter 16 is mounted to a process vessel V, see FIG. 1, using a flange 18. The process adapter 16 may be threaded or welded to the flange 18. Alternatively, the process adapter 16 may be threaded directly into an opening in the process vessel V.

The through air radar level measurement instrument 10 launches a radar signal which reflects off a liquid or other media surface and measures time of flight between transmission and reception of the radar signal. Electrical energy is converted to an electromagnetic wave from the launching element which propagates through free space. The system operates a signal around 26 GHz.

Figure 3:
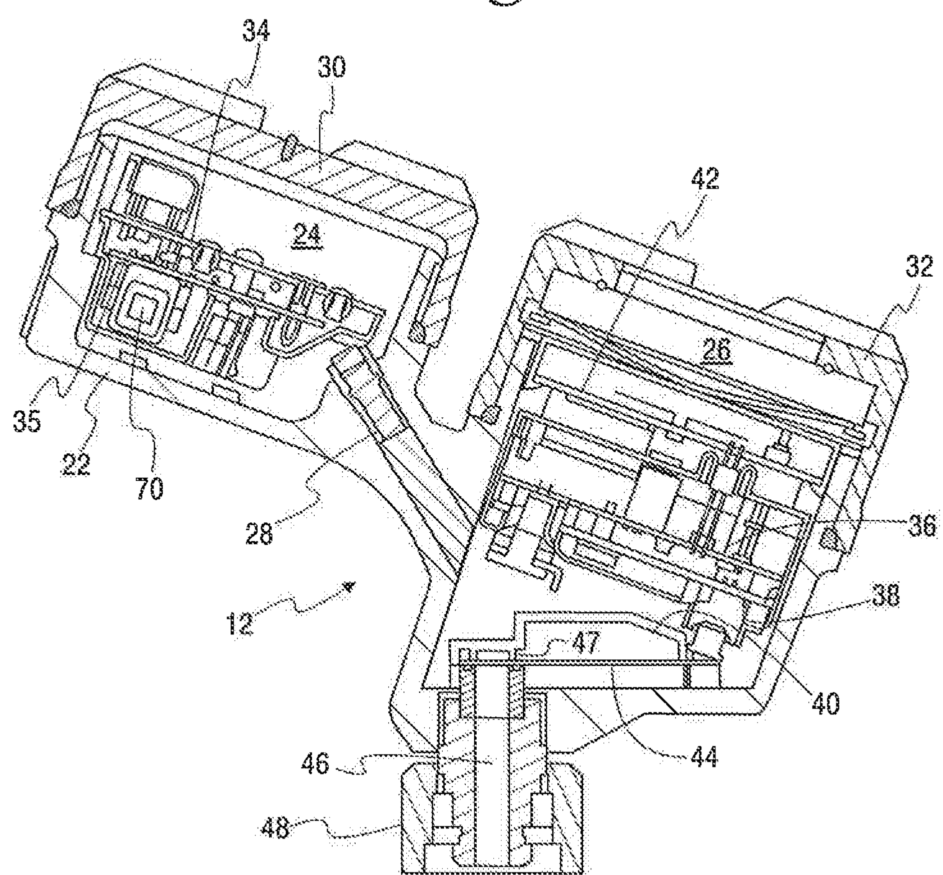
FIG. 3 is a side section view of the dual compartment control housing.

Referring to FIG. 3, the control housing 12 comprises a dual compartment housing including a base 22 defining an explosion proof wiring compartment 24 and an intrinsically safe control compartment 26 connected via a passage 28. A first cover 30 encloses the wiring compartment 24. A second cover 32 encloses the control compartment 26. The wiring compartment 24 houses a wiring board 34 and a galvanic transformer board 35 for connecting to a remote power source and including necessary interface circuitry. This circuitry is in communication with a digital PC board 36 and an analog PC board 38 in the control compartment 26. The digital PC board 36 includes a microprocessor or microcontroller for controlling functionality of the overall instrument. The analog PC board 38 includes signal processing circuitry which drives a radio frequency (RF) module 40 and further processes a return signal from the RF module 40. The RF module 40 is in communication with the antenna 14, as described below. A display/keypad PC board 42 is connected to the digital PC board 36 and is viewable through and accessible upon removal of the second cover 32.

The form of the housing 12 and the circuits therein are illustrated and described by way of example only. The invention is particularly directed to a controller implementing a first moving echo algorithm to determine a material level, as described below.

The RF module 40 has a printed circuit board 44 with a conventional launching element. In the illustrated embodiment, the launching element comprises electro-magnetic radiating elements which are conductive traces designed on the circuit board 44. The launching element generates and receives a high frequency signal for measuring level. The launching element may be in the form of that shown in application Ser. No. 15/676,277, filed, Aug. 14, 2017, owned by the applicant herein and the specification of which is incorporated by reference herein.

An air-filled antenna waveguide 46 is sealingly mounted to the control housing 12 and aligned with the launching element on the printed circuit board 44. Thus, the launching element works together with the waveguide 46 and a waveguide cap 47 to generate the launching signal to the antenna 14, as is known. The air-filled waveguide 46 is adapted to operate in the K band.

The antenna waveguide 46 is surrounded by a quick connect coupler 48 for mating with a corresponding quick connect coupler 50 on the antenna 14, see FIG. 2. This provides a quick connect/disconnect coupling that allows the vessel V to remain sealed upon removal of the control housing 12.

Figure 4:
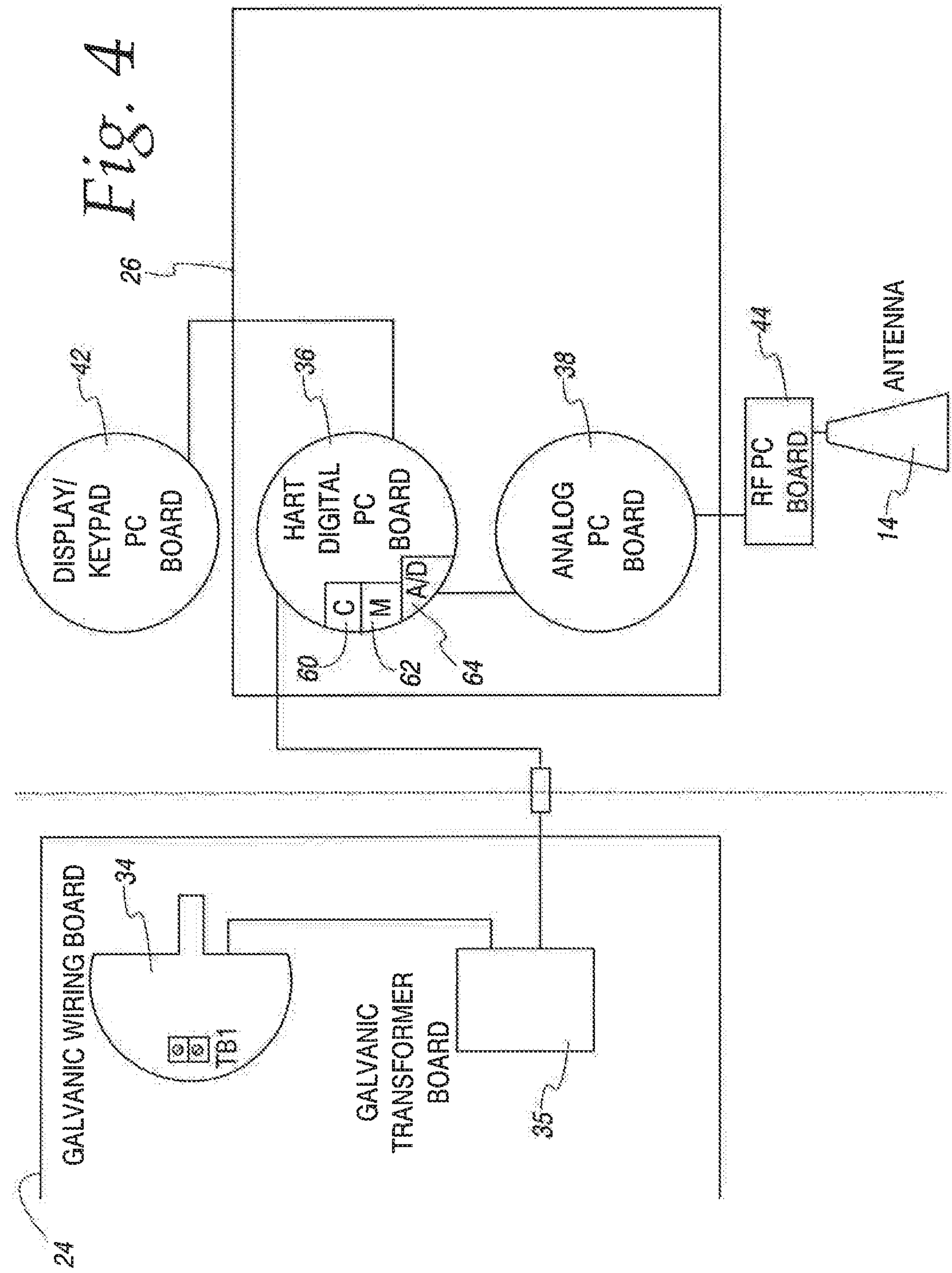
FIG. 4 is a block diagram illustrating the relationship between circuit boards in the dual compartment control housing of FIG. 3.

Referring also to FIG. 4, the display/keypad PC board 42 provides a user interface for entering parameters with a keypad and displaying user and status information. The digital PC board 36 includes a controller 60, which may be in the form of a conventional microcontroller, and memory 62. The memory 62 may comprise both non-volatile memory for storing programs and calibration parameters, as well as volatile memory used during level measurements. The controller 60 is connected to the analog PC board 38 using a conventional analog-to-digital (A/D) converter 64. The digital PC board is also connected through the galvanic transformer board 35 to the wiring board 34 for connecting to a remote and external power source over a two-wire loop. The two-wire connection is used to communicate level information, as is well known. The circuits in the wiring compartment 24 accept supply voltage at input terminals TB1 from the customer and provide power to the balance of the unit 10.

Figure 5:
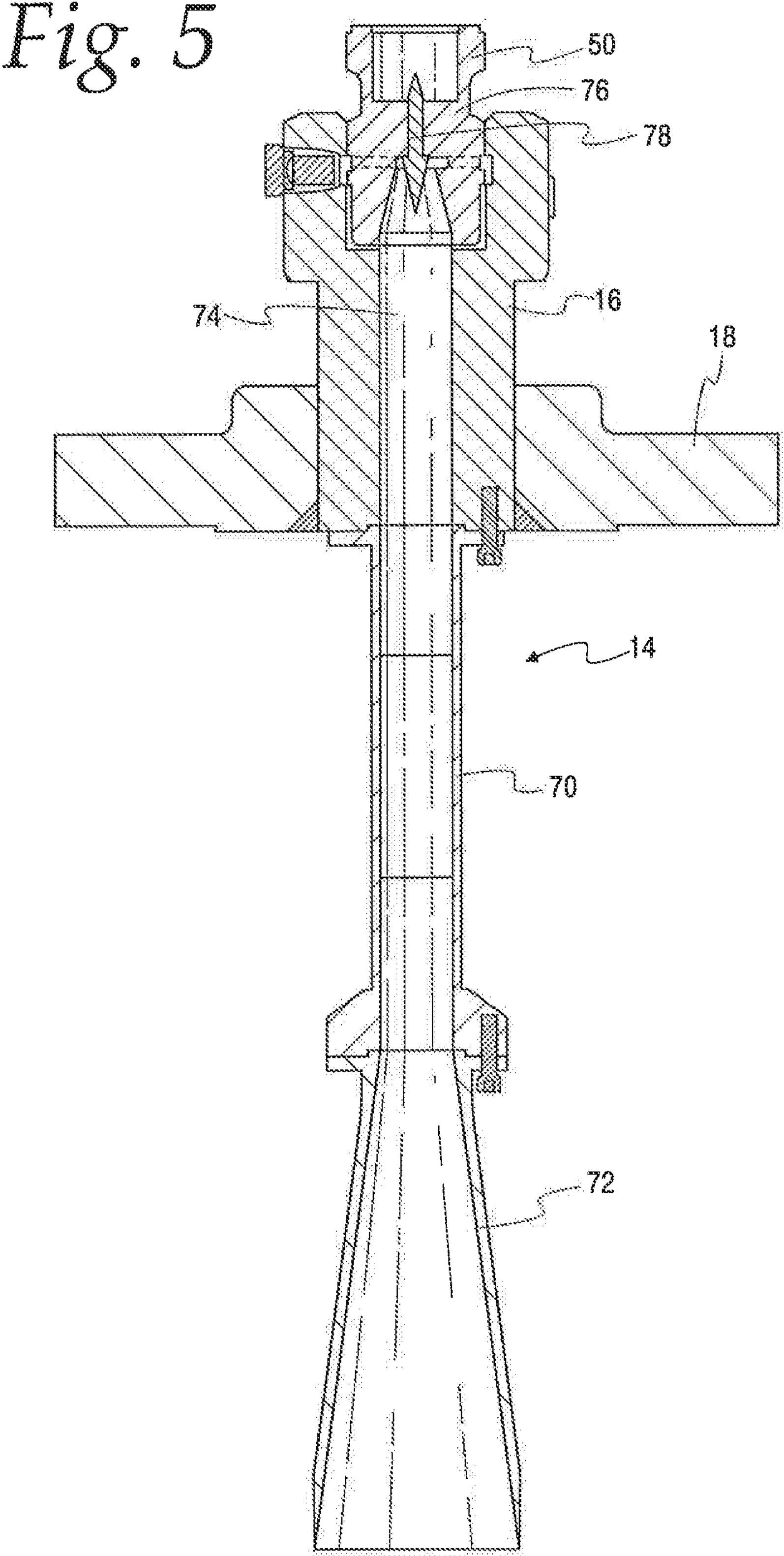
FIG. 5 is a sectional view of the primary element.

Referring to FIG. 5, the antenna 14 comprises a horn extension 70 mounted to the process adapter 16 at one end and an opposite end connected to an antenna horn 72. The process adapter 16 has a through opening 74 that with the horn extension 70 and antenna horn 72 provide a continuous hollow space open to an interior I of the process vessel V, see FIG. 1, in use. The process adaptor 16 houses a seal adapter 76 including a seal 78. The seal 78 provides a process seal and a transition from the waveguide 46, se FIG. 3, to the antenna 14.

The transmitter is a top-mounted, downward-looking pulse burst radar transmitter operating at 26 GHz. Unlike true pulse devices which transmit a single, sharp (fast rise-time) waveform of wide-band energy, the transmitter emits short bursts of 26 GHz energy, see FIG. 6, and measures the transit time of the signal reflected off the liquid or other media surface, see FIG. 7. Particularly, the instrument 10 uses pulse-burst radar technology with ETS circuitry. ETS is accomplished by scanning the tank to collect thousands of samples. A scan frequency of 2.4 Hz is used and about 14,000 samples are acquired per measurement scan. Short bursts of microwave energy are emitted and subsequently reflected from a surface. The distance is calculated by the equation.

$$D = (\text{velocity of EM propagation}) * \text{transit time (round trip)}/2.$$

Level is then calculated by applying a tank height value. ETS is used to measure the high speed, low power electromagnetic (EM) energy. The high-speed EM energy (1,000 ft/μs) is difficult to measure over short distances and at the resolution required in the process control industry. ETS captures the EM signals in real time (nanoseconds) and reconstructs them in equivalent time (milliseconds), which is much easier to measure. ETS is accomplished by scanning the vessel to collect thousands of samples. The round-trip event on a 42 meter tank takes only 280 nanoseconds in real time. After it is reconstructed in equivalent time it measures about 215 milliseconds.

Figure 6:
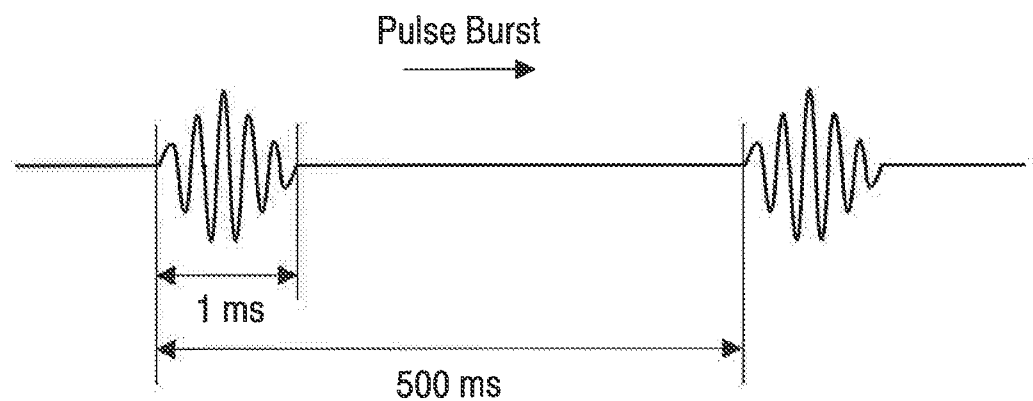
FIG. 6 is a curve illustrating a pulse burst waveform.
Figure 7:
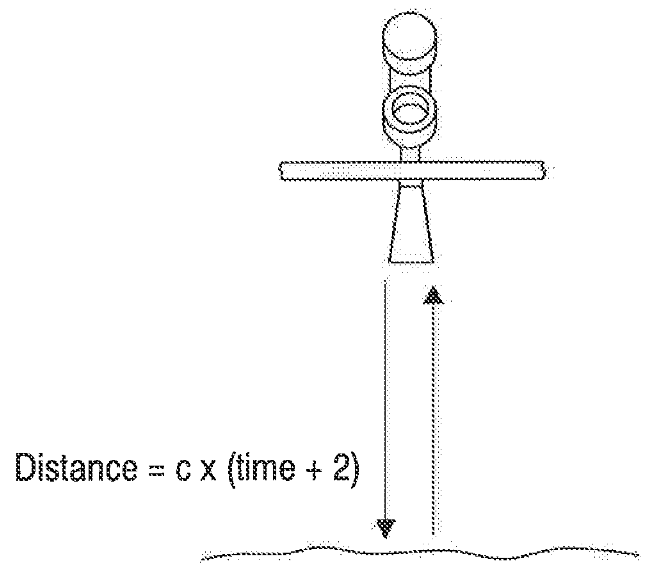
FIG. 7 is a diagram illustrating level measurement.

As is known, the controller 60 generates a drive signal to the analog PC board 38 to cause the launching element on the RF PC board 44 to transmit a pulse signal in the form of a pulse burst, see FIG. 6, at a target of interest. The launching element in turn receives reflected echoes of the pulse signal supplied to the analog PC board 38. The circuitry on the analog PC board develops an echo waveform signal from the receive signal. U.S. Pat. No. 8,220,584, the specification of which is hereby incorporated by reference herein, describes known methodology for processing waveform envelope data. The digital PC board A/D converter 64 digitizes the echo waveform signal which is then supplied to the controller 60. The digitized data is accumulated as a running average of multiple acquired envelope signal traces to produce a more stable waveform representation. The average waveform data can be searched by the controller 60 for each measurement scan to identify echo peaks resulting in a list of qualified echoes, referred to herein as a peak list, with attributes such as distance and amplitude. The qualified echoes are those exceeding a threshold, as discussed below. The peak list is stored in the memory 62. The peak list for the most recent measurement scan is referred to as an active peak list. The memory 62 includes a buffer which stores peak lists from prior measurement scans. The controller 60 is operable to match peaks in the active peak list to peaks in the buffer peak list to select a target peak from the active peak list based on which of the matched peaks have moved, and determining material level responsive to the target peak.

Existing through-air level measurement instruments use various methods such as first echo and largest echo for determining the echo peak corresponding to the process media level from available peaks. Both methods can result in the selection of a peak that does not correspond to the actual media surface, especially in the presence of obstructions such as mixing blades. The instrument 10 described herein additionally uses a First Moving Echo (FME) algorithm that uses motion detection to identify the best candidate for the target peak corresponding to the media surface level while ignoring stationary peaks caused by fixed obstructions.

Three algorithms are implemented in the described instrument 10. The mode of operation is user-selectable using a Target Selection parameter with selections of First Echo, Largest Echo and First Moving Echo.

The FME algorithm must tolerate multiple reflection conditions such as occur when the liquid surface is close to the antenna and returning radar signals reflect off the antenna or the tank roof and back to the liquid surface before returning to the transmitter. This may occur multiple times, resulting in multiple reflections. Such reflections can appear to move at multiples of the velocity of the actual liquid surface. Consideration has also been given to situations where the level surface is stationary for an indefinite period of time, especially at time of transmitter installation.

An overview of the process follows. For each time of flight measurement scan, the low-resolution averaged waveform data is searched to populate the active peak list. Previously encountered peaks are identified in the active peak list by comparing their attributes to those in the previously stored buffer peak list, including:

| | |
|---|---|
| Position [distance] | merit factor = 500; |
| Height [amplitude] | merit factor = 100; |
| Width | merit factor = 100; |
| Type | merit factor = 10; and |
| Delta D [change in distance] | merit factor = 50. |

Each above attribute comparison has an associated weighting or merit factor. Position [distance] has the highest weight.

New peaks (those which do not appear to match any peaks in the prior peak lists) are given an identification number, have their minimum and maximum distance set to the current distance value (distance traveled=0), and have their Traveled attribute cleared. Matched peaks retain the ID and assume the attributes of the prior peak to which they are matched. Peak attributes are updated with information from the active peak list and the buffer peak list. In particular, a peak is designated as having traveled when its distance traveled value (difference between its minimum and maximum positions) exceeds a distance threshold. The active peak list is then searched for adjacent peaks that are close together (which may be merging/emerging), clears their and all subsequent (more distant) peaks' Traveled status and zeros those peaks' Distance Traveled values. The active peak list is put into the buffer peak list history, displacing the oldest list. The prevailing target region (described later) is searched for peaks. A target peak is selected from the active peak list or prevailing target window region, and a corresponding distance value is computed. The active target window region position is updated based on the new distance value.

First Moving Echo Peak Selection Process

After the active peak list has been updated, the prevailing target region is evaluated (searched for peaks) and a target peak is selected based on the following hierarchy:

1. Moving peak found closer than prevailing target window region;

2. Moving peak found within prevailing target window region;

3. Moving peak found farther than prevailing target window region;

4. Closest [stationary] peak found;

5. [No Target found].

The first (lowest number) case in this list that is satisfied is used to select the target peak (higher numbered cases are then irrelevant).

Once a peak has been selected as a moving target peak, it will remain designated as the target peak as long as it can be detected (whether it continues moving or not) and there are no moving peaks closer to the transmitter. If no peaks have been identified as having moved, the closest detected peak will become the target (case 4).

Because it is possible that the algorithm initially selected the wrong peak or the liquid surface echo has disappeared, the system is continually monitored for motion, allowing a new target peak to be selected (case 1).

There are situations where no moving peaks exist such as at initial transmitter startup, typically resulting in case 4, unless the device has been commissioned utilizing the User Selection of Level feature described later in this document.

Motion Determination

A peak is designated as being a moving peak (has Traveled status) when its distance traveled value exceeds a distance threshold. The distance traveled for a particular peak is the difference between that peak's minimum distance position recorded and its maximum distance position recorded.

The threshold applied to the traveled value is either the parameter value Distance Threshold or that value scaled by the ratio of peak distance to the prevailing distance to favor the prevailing distance over multiple reflections which will be moving faster. The scaled threshold is applied to peaks that are more distant than the prevailing target distance.

Target Window Region Processing

A challenging aspect of target selection is handling cases where peaks merge (for example, a liquid surface echo moves into a region containing an echo from an obstruction). In these cases, peak shapes can become distorted and two peaks can combine into one and vice versa.

To ensure that a peak which has been selected as a moving target peak will remain designated as the target as long as it exists (even if it becomes distorted and unrecognizable in low-resolution waveform data), a specific region of waveform data is searched for peaks. This target window region is defined by the prevailing distance location and the value of the parameter named Max Distance Jump. The window boundaries are given by Distance+/−Max Distance Jump*2.

A target location within the prevailing region will normally be determined, and the region position (centered on the Distance value) updated following each measurement scan.

User Selection of Level Location

In many applications, the liquid level may remain stationary for long periods of time, rendering the FME algorithm ineffective until initial liquid surface movement occurs.

A mechanism has been implemented to allow operators to manually select the level location (informing the transmitter which peak corresponds to the liquid surface). This provides a means to achieve correct operation when commissioning the transmitter without relying on movement of the liquid surface or use of any Echo Rejection feature.

When this feature is invoked, the operator is presented with a list of peak distances and amplitudes that will allow them to select the peak corresponding to the media surface.

When a user selects the level location, the Traveled flag for that peak is set and its Distance Traveled values are also modified to exceed the prevailing Distance Threshold. The Traveled flag is cleared and the Distance Traveled values are reset for all other peaks to ensure that the newly selected peak will be selected as the [moving] target peak.

The altered peak list is stored in the peak list FIFO to ensure that subsequent comparisons will result in retention of the new pseudo-moving peak.

Interaction with the Boundary Condition State Machine

Minor changes to the Boundary Condition State Machine [BCSM] to support the FME algorithm were necessary, with the existing functionality operating much as it does for the other target algorithms.

The BCSM is continually operating and managed by a separate task in the firmware. The First Moving Echo logic requests the BCSM to transition to the restart state when a new peak is selected as the target. This ensures that the new target peak will be accepted and considered to be a valid representation of the liquid level by the BCSM.

Certain cases must allow the BCSM to accept level changes outside of the normally accepted region. One such case is the selection of a peak via a user interface, as described above. The new target location must be accepted by the BCSM logic regardless of the prior state. A similar case is the initial detection of a moving echo, which should also be immediately accepted regardless of where the previous distance position was. Other cases are shown in the logic flow diagram.

Signal Margin Calculation

Signal Margin calculation is different for each target selection algorithm. For First Moving Echo, the margin is simply Signal-vs-Threshold. Noise is presumed to be irrelevant.

Transmitter Restart/Recovery

Because the FME algorithm operates with historical data and can take long periods of time to determine the correct target position, a means to periodically store FME-specific state information in non-volatile memory (an essentially infinitely re-writable F-RAM device) may be used. Short duration outages of power supplied to the transmitter will then be tolerated without loss of accumulated FME state information.

Figure 8A:
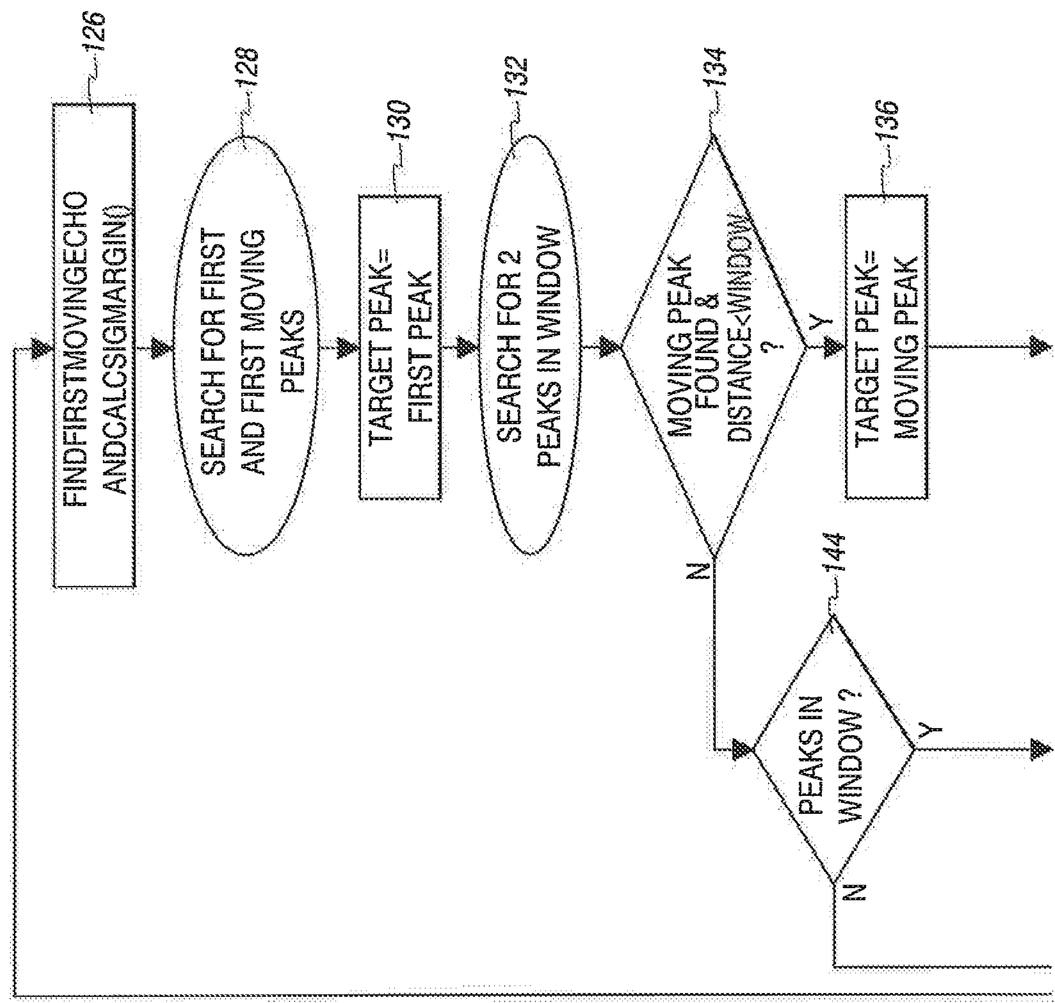
Figure 8A:
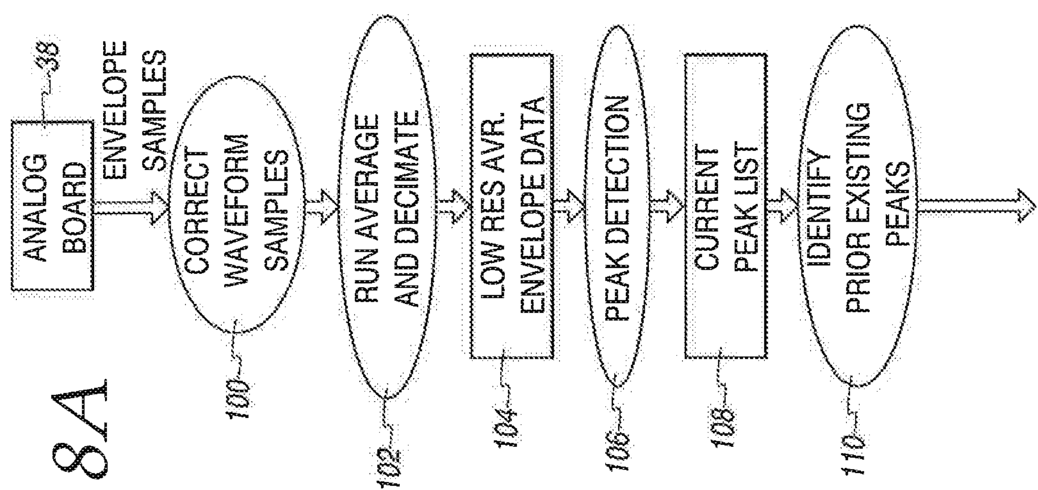

FIGS. 8A and 8B illustrate a flow chart showing operation of the First Moving Echo algorithm implemented in the controller 60 of FIG. 4. Both the First Echo and Largest Echo algorithms use the most recent low-resolution run-averaged peak list, i.e., the active peak list. The FME functions also utilize the active peak list. In addition to the active peak list, a FIFO buffer of previous peak lists is maintained. This peak list history is used to match current peaks to previous peaks and to determine whether peaks have moved.

The flow chart begins where the analog board 38 provides a return envelope waveform for a measurement scan to the A/D converter 64 and thus the controller 60. The waveform samples are corrected at a block 100. The samples are averaged and decimated at a block 102 to produce low resolution average envelope waveform data at a block 104. The controller then implements a peak detection routine at a block 106. The peak detection routine compares the waveform to a threshold to determine the location of peaks in the current measurement scan and stores the data for the peaks in an active, or current, peak list at a block 108. The data stored in the list would include, for example, position, height, width, and type. The program then identifies prior existing peaks from the buffer peak list and compares them to the active peak list to match the same at a block 110 and updates the identified peak's attributes at a block 112. The peaks distance travel for merged peaks is reset at a block 114. This information is stored in the FIFO buffer peak list at a block 116.

A decision block 118 determines if the controller 60 is configured to use the First Moving Echo algorithm. If not, then a decision block 120 determines if the program is configured to use the Largest Echo algorithm. If so, then the program finds the largest echo and calculates the signal margin at a block 122. If not, then the program finds the first echo and calculates the signal margin at a block 124.

If the First Moving Echo algorithm is being used, as determined at the decision block 118, then the program proceeds to a block 126 to find the first moving echo and calculate signal margin. The program searches for the first peak and the first moving peak at a block 128 and initially sets the target peak to the first peak at a block 130. The program then searches for two peaks in the target window region at a block 132. A decision block 134 determines if the moving peak is found and the distance is less than the window. If so, then the target peak is set equal to the moving peak at a block 136. The Boundary Condition State Machine is restarted at a block 138. The signal margin is calculated at a block 140 and the target peak location is returned at a block 142. If the moving peak was found and the distance is not less than the location of the target window, as determined at the decision block 134, then a decision block 144 determines if there are any peaks in the prevailing target region, or window. If so, then a decision block 146 determines if the first peak is moving. If so, then the first peak is set as the target peak at a block 148 and the program proceeds to the block 138. If the first peak is not moving, then the decision block 150 determines if the second peak is moving. If so, then the second peak is set as the target peak at a block 152 and the program proceeds to the block 138. If the second peak is not moving, as determined at the decision block 150, or no peaks were found in the window, as determined at the decision block 144, then a decision block 154 determines whether or not any moving peak was found. If so, then the first peak is set as the target peak at a block 156 and if not, then the first peak in the window is set as the target peak at the block 158. From either block 156 or 158, the program advances to a decision block 160 which determines if the first moving echo state is equal to the first moving echo initial moving peak detected. If not, then the program advances to the block 140. If so, then the BCSM is restarted at a block 162 and the first moving echo state is set equal to the first moving echo initial moving peak excepted at a block 164 and then the program proceeds to the block 140.

The operation of the First Moving Echo algorithm is described relative to the sequence of curves illustrated in FIGS. 9A, 9B, 9C and 9D. These are waveforms from a sequence of select measurement scans. This example includes one fixed obstruction echo. Detected echoes, or peaks, are identified with numbers. Moving peaks are identified with a diamond symbol. The target echo, as determined by the algorithm, is labeled with a T.

The base threshold is the amplitude that signals must exceed to be considered a detected peak. For the First Moving Echo algorithm, only peaks that exceed the target threshold are used. When other measurement algorithms are used, such as First Echo, the peaks less than the target threshold are considered noise and are used to compute signal margin.

Figure 9A:
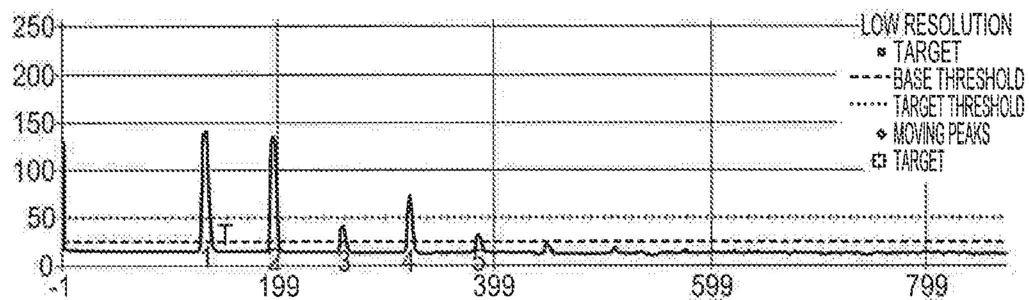
FIGS. 9A-9D are a series of curves illustrating an example of a sequence of waveforms analyzed by the first moving echo control logic.

FIG. 9A illustrates a waveform shortly after initialization. Five peaks are detected. None of the peaks are known to be moving. The first peak, the one closest to the Y axis, that exceeds the target threshold is selected as the target echo. In this example, a fixed obstruction echo.

Figure 9B:
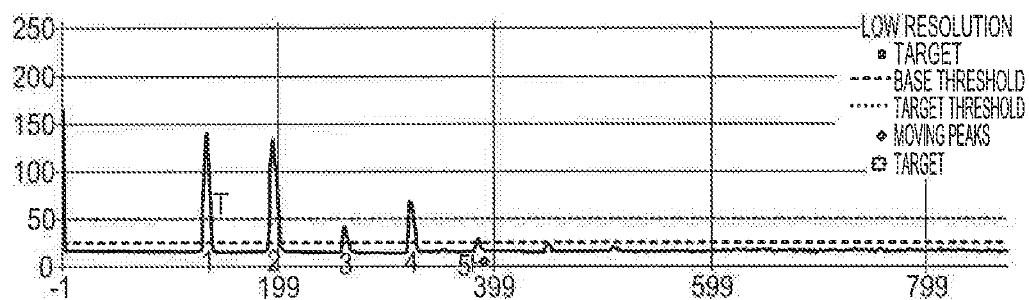

FIG. 9B illustrates a waveform in which peaks 2, 4 and 5 have moved. However, only peak 5 has moved sufficiently to exceed the distance threshold. However, the peak does not exceed the peak threshold so that peak 1 remains the target echo.

Figure 9C:
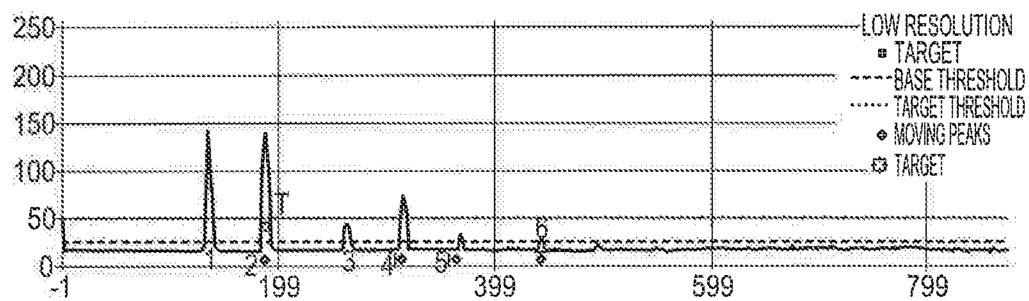

FIG. 9C illustrates an example where peak 2 has moved enough to exceed the distance threshold and is selected as the target echo. Peaks 4, 5 and 6 are known to be moving peaks. Peak 2 is the first moving echo and is therefore selected as the target echo.

Figure 9D:
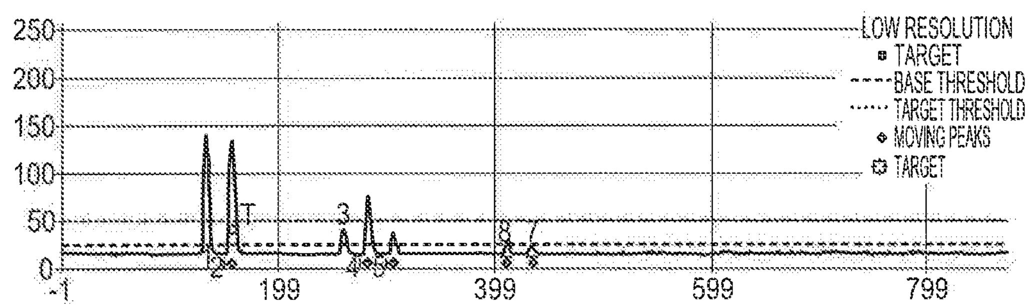

FIG. 9D illustrates a further progression of the waveform and the second peak again is the first moving echo and remains selected as the target echo.

It will be appreciated by those skilled in the art that there are many possible modifications to be made to the specific forms of the features and components of the disclosed embodiments while keeping within the spirit of the concepts disclosed herein. Accordingly, no limitations to the specific forms of the embodiments disclosed herein should be read into the claims unless expressly recited in the claims. Although a few embodiments have been described in detail above, other modifications are possible. Other embodiments may be within the scope of the following claims.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The foregoing disclosure of specific embodiments is intended to be illustrative of the broad concepts comprehended by the invention.

The invention claimed is:

1. A level measurement instrument comprising:

an analog circuit for transmitting a pulse signal at a target of interest and receiving reflected echoes of the pulse signal and developing an echo waveform representative of the reflected echoes; and a programmed digital circuit operatively coupled to the analog circuit, and comprising a programmed controller and memory, the controller being operatively programmed to identify peaks in the echo waveform and store an active peak list from a current measurement scan and a buffer peak list from prior measurement scans, to match peaks in the active peak list to peaks in the buffer peak list, to select a target peak from the active peak list based on which of the matched peaks have moved, and determining material level responsive to the target peak.

2. The level measurement instrument of claim 1 wherein the controller is operable to select a first moving echo as the target peak.

3. The level measurement instrument of claim 1 wherein the controller is operable to store a prevailing target region and the target peak is selected based on one of a moving peak found closer than the prevailing target region, a moving peak found within the prevailing target region, or a moving peak found farther than the prevailing target region.

4. The level measurement instrument of claim 1 wherein the controller designates an active peak as a moving peak when it has a distance traveled value greater than a select threshold.

5. The level measurement instrument of claim 1 wherein peaks are matched by comparing attributes of peaks in the active peak list to peaks in the buffer peak list.

6. The level measurement instrument of claim 5 wherein the attributes are selected from among peak position, peak height, peak width, peak type and change in peak position.

7. The level measurement instrument of claim 6 wherein each of the attributes has an associated merit factor for prioritizing the attributes comparison.

8. The level measurement instrument of claim 1 wherein a peak remains designated as the target peak as long as the target peak remains detected and there are no other moving peaks closer to the instrument.

9. The level measurement instrument of claim 1 wherein the controller determines a prevailing target region as a region centered on distance to a previously determined target peak.

10. The level measurement instrument of claim 9 wherein the controller updates the prevailing target region subsequent to each measurement scan.

11. A through air measurement instrument comprising:

an RF circuit for transmitting a pulse signal at a target of interest and receiving reflected echoes of the pulse signal;

an analog circuit coupled to the RF circuit developing an echo waveform representative of the reflected echoes; and a programmed digital circuit operatively coupled to the analog circuit, and comprising a programmed controller and memory, the controller implementing a first moving echo algorithm to identify peaks in the echo waveform and store an active peak list from a current measurement scan and a buffer peak list from prior measurement scans, to match peaks in the active peak list to peaks in the buffer peak list, to select a target peak from the active peak list based on a first one of the matched peaks which have moved, and determining material level responsive to the target peak.

12. The through air measurement instrument of claim 11 wherein the controller is operable to alternatively select a first echo or a largest echo as the target peak.

13. The through air measurement instrument of claim 11 wherein the controller is operable to store a prevailing target region and the target peak is selected based on one of a moving peak found closer that the prevailing target region, a moving peak found within the prevailing target region, or a moving peak found farther than the prevailing target region.

14. The through air measurement instrument of claim 11 wherein the controller designates an active peak as a moving peak when it has a distance traveled value greater than a select threshold.

15. The through air measurement instrument of claim 11 wherein peaks are matched by comparing attributes of peaks in the active peak list to peaks in the buffer peak list.

16. The through air measurement instrument of claim 15 wherein the attributes are selected from among peak position, peak height, peak width, peak type and change in peak position.

17. The through air measurement instrument of claim 16 wherein each of the attributes has an associated merit factor for prioritizing the attributes comparison.

18. The through air measurement instrument of claim 11 wherein the controller a peak remains designated as the target peak as long as the target peak remains detected and there are no other moving peaks closer to the instrument.

19. The through air measurement instrument of claim 11 wherein the controller determines a prevailing target region as a region centered on distance to a previously determined target peak.

20. The through air measurement instrument of claim 19 wherein the controller updates the prevailing target region subsequent to each measurement scan.

* * * * *